United States Patent
Zerba et al.

(10) Patent No.: US 10,661,621 B2
(45) Date of Patent: May 26, 2020

(54) FIFTH WHEEL HITCH ASSEMBLY HAVING DIRECT-MOUNT MOUNTING BRACKETS

(71) Applicant: SAF-HOLLAND, Inc., Holland, MI (US)

(72) Inventors: Michael Zerba, Holland, MI (US); Michael D. Appel, Wyoming, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 0 days.

(21) Appl. No.: 14/996,908

(22) Filed: Jan. 15, 2016

(65) Prior Publication Data

US 2016/0129741 A1    May 12, 2016

Related U.S. Application Data

(60) Division of application No. 14/277,842, filed on May 15, 2014, which is a continuation-in-part of application No. 13/830,589, filed on Mar. 14, 2013, now Pat. No. 9,126,464.

(60) Provisional application No. 61/826,270, filed on May 22, 2013.

(51) Int. Cl.
| | |
|---|---|
| *B60D 1/01* | (2006.01) |
| *B62D 53/08* | (2006.01) |
| *B60D 1/52* | (2006.01) |
| *B60D 1/24* | (2006.01) |
| *B60D 1/00* | (2006.01) |

(52) U.S. Cl.
CPC ............. *B60D 1/015* (2013.01); *B60D 1/24* (2013.01); *B60D 1/52* (2013.01); *B62D 53/08* (2013.01); *B62D 53/0814* (2013.01); *B60D 2001/001* (2013.01)

(58) Field of Classification Search
CPC . B60D 1/015; B60D 1/24; B60D 1/52; B60D 2001/001; B62D 53/08; B62D 53/0814
USPC .......................................................... 280/433
See application file for complete search history.

(56) References Cited

U.S. PATENT DOCUMENTS

| | | | |
|---|---|---|---|
| 2,138,679 A | 11/1938 | Sherman | |
| 2,196,537 A | 4/1940 | Sherman | |
| 2,336,939 A | 12/1943 | Kinne | |
| 2,602,674 A | 7/1952 | Harris | |
| 2,640,711 A | 6/1953 | Preble et al. | |
| 2,903,275 A * | 9/1959 | Walther | B62D 53/0807 280/407 |
| 2,958,542 A | 11/1960 | Janeway | |
| 3,077,357 A | 2/1963 | Rugg | |
| 3,117,772 A | 1/1964 | Brown | |

(Continued)

*Primary Examiner* — Jacob D Knutson
*Assistant Examiner* — Felicia L. Brittman
(74) *Attorney, Agent, or Firm* — Price Heneveld LLP (57) ABSTRACT

A fifth wheel hitch assembly is provided that includes a mounting bracket adapted to support a fifth wheel hitch plate and having a substantially vertical surface, a vehicle frame rail having a substantially horizontal portion and a substantially vertical portion; and a support bracket having a first portion secured to the substantially vertical portion of the vehicle frame rail and a second portion secured to the substantially vertical surface of the mounting bracket, and having a plurality of mounting positions spaced longitudinally along the support bracket from one another, wherein the mounting bracket is releasably secured to less than a total number of the mounting positions.

14 Claims, 12 Drawing Sheets

(56) References Cited

U.S. PATENT DOCUMENTS

| | | | |
|---|---|---|---|
| 3,580,611 | A | 5/1971 | McNitt |
| 3,950,011 | A | 4/1976 | Yamanaka |
| 4,762,334 | A | 8/1988 | Altherr |
| 5,344,173 | A | 9/1994 | Beeler et al. |
| 5,368,324 | A | 11/1994 | Kaim |
| 5,765,849 | A | 6/1998 | Moulton et al. |
| 6,592,140 | B1 | 7/2003 | Alguera et al. |
| 6,726,179 | B2 | 4/2004 | Ketchapaw et al. |
| 6,729,635 | B2 | 5/2004 | Gallego et al. |
| 7,044,492 | B1 | 5/2006 | Andersson |
| 7,121,573 | B2 | 11/2006 | Lindenman et al. |
| 7,140,633 | B2 | 11/2006 | Audo et al. |
| 7,264,259 | B2 | 9/2007 | Lindenman et al. |
| 7,448,639 | B1 | 11/2008 | Mann et al. |
| 7,487,990 | B2 | 2/2009 | Roth-Schuler et al. |
| 7,699,334 | B1 | 4/2010 | Mann et al. |
| 7,753,390 | B1 | 7/2010 | Mann et al. |
| 7,874,569 | B2 | 1/2011 | Schmidt et al. |
| 8,573,627 | B2 | 11/2013 | Appel |
| 8,814,197 | B2 * | 8/2014 | Keatley ................ B60D 1/015 280/432 |
| 2002/0121762 | A1 | 9/2002 | Laarman |
| 2008/0231018 | A1 | 9/2008 | Roth-Schuler et al. |
| 2012/0280472 | A1 * | 11/2012 | Appel ................ B62D 53/0814 280/441 |
| 2013/0106076 | A1 | 5/2013 | Zaagman |
| 2013/0168946 | A1 | 7/2013 | Alguera |
| 2013/0285347 | A1 * | 10/2013 | Keatley ................ B60D 1/015 280/433 |
| 2013/0328286 | A1 | 12/2013 | Zerba |
| 2013/0328287 | A1 | 12/2013 | Keatley |
| 2014/0035257 | A1 | 2/2014 | Van Der Knapp et al. |

\* cited by examiner

FIFTH WHEEL HITCH ASSEMBLY HAVING DIRECT-MOUNT MOUNTING BRACKETS

CROSS-REFERENCE TO RELATED APPLICATIONS

This application is a divisional of U.S. patent application Publication Ser. No. 14/277,842, filed May 15, 2014, entitled "FIFTH WHEEL ASSEMBLY HAVING DIRECT-MOUNT MOUNTING BRACKETS," which is a continuation-in-part of U.S. patent application Ser. No. 13/830,589, filed on Mar. 14, 2013, now U.S. Pat. No. 9,126,464, entitled "FIFTH WHEEL ASSEMBLY WITH AUTOMATIC LOCKOUTS," and claims the benefit of U.S. Provisional Patent Application No. 61/826,270, filed on May 22, 2013, entitled "FIFTH WHEEL HITCH ASSEMBLY HAVING DIRECT-MOUNT MOUNTING BRACKETS," the entire contents of which are incorporated herein.

FIELD OF THE INVENTION

The present invention generally relates to a fifth wheel hitch assembly and more specifically to a fifth wheel hitch assembly usable with vehicle frame rails of various configurations.

BACKGROUND OF THE INVENTION

Fifth wheel hitch assemblies are in wide use today. However, many fifth wheel hitch assemblies have complicated componentry, which may add unnecessary cost and weight to the vehicle on which it's used. Therefore, there is a need for a fifth wheel hitch assembly that does not suffer from the above-mentioned drawbacks.

SUMMARY OF THE INVENTION

According to one aspect of the present invention, a fifth wheel hitch assembly is to provided having a mounting bracket adapted to support a fifth wheel hitch plate and having a substantially vertical surface, a vehicle frame rail having a substantially horizontal portion and a substantially vertical portion, and a support bracket having a first portion secured to the substantially vertical portion of the vehicle frame rail and a second portion secured to the substantially vertical surface of the mounting bracket and having a plurality of mounting portions spaced longitudinally along the support bracket from one another, wherein the mounting bracket is releasably secured to less than a total number of the mounting positions.

Another aspect of the present invention is to provide a fifth wheel hitch assembly that includes a first mounting bracket adapted to support a fifth wheel hitch plate, a second mounting bracket adapted to support a fifth wheel hitch plate, a first vehicle frame rail, and a second vehicle frame rail. The fifth wheel hitch assembly further includes a first support bracket having a first portion releasably secured to a substantially vertical portion of the first vehicle frame rail and a second portion releasably secured to a substantially vertical portion of the first mounting bracket, a second support bracket having a first portion releasably secured to a substantially vertical portion of the second vehicle frame rail and a second portion releasably secured to a substantially vertical portion of the second mounting bracket, and a structural cross member releasably secured to the first and second mounting brackets.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
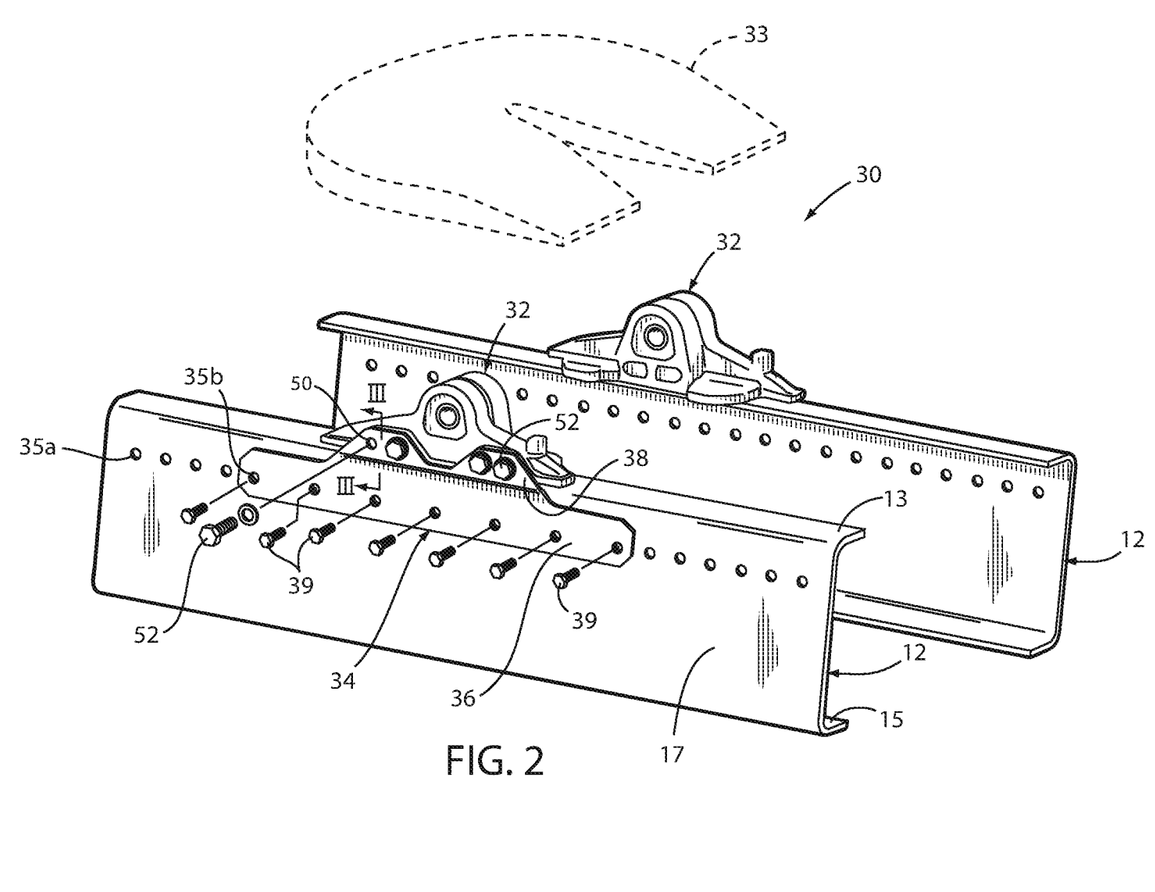
FIG. 2 is a perspective view of the present inventive fifth wheel hitch assembly according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
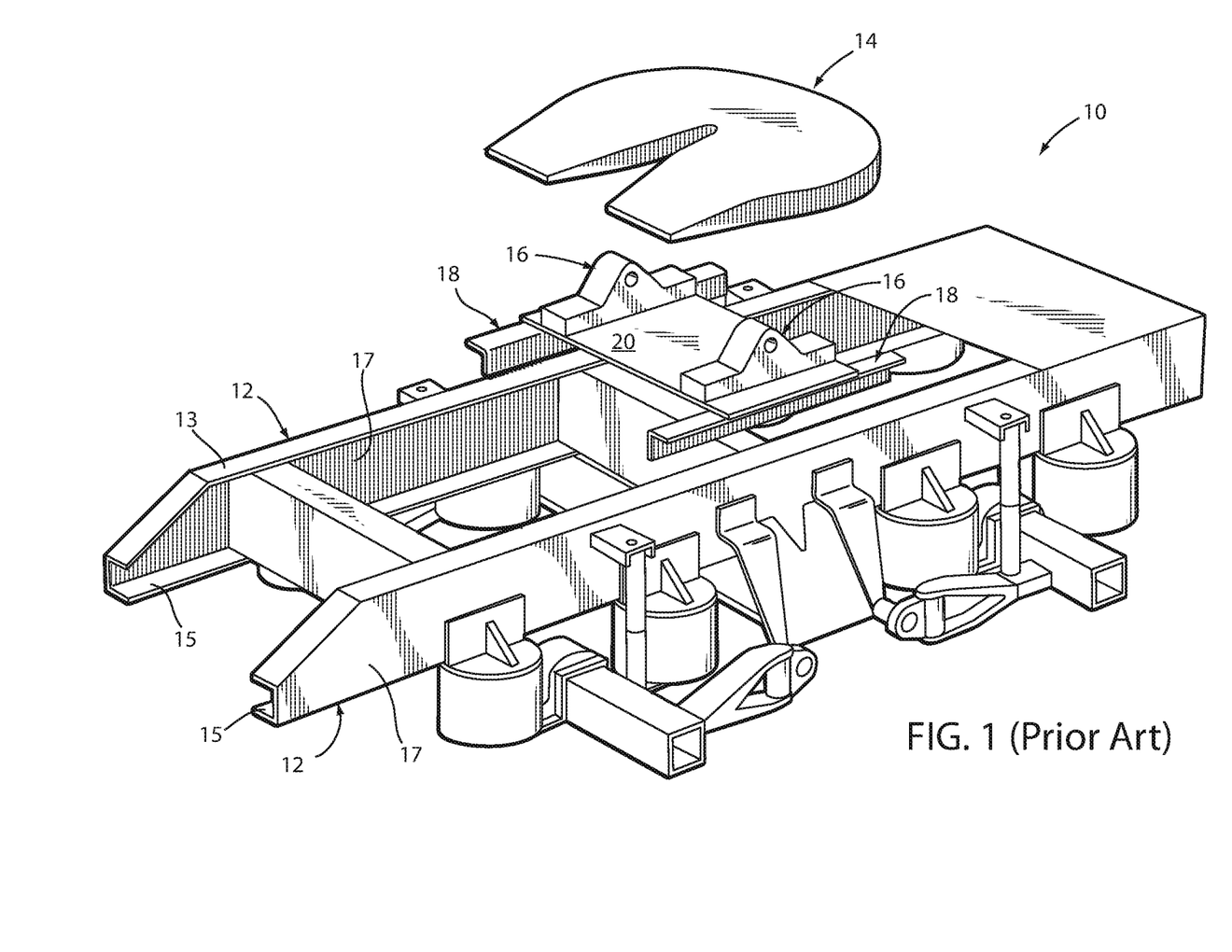
FIG. 1 is a perspective view of a prior art fifth wheel hitch assembly mounted to vehicle frame rails.

A standard fifth wheel hitch assembly 10 is generally illustrated in FIG. 1. The fifth wheel hitch assembly 10 is mounted to vehicle frame rails 12 of an associated vehicle, such as a tractor trailer, or trailer assembly, where each vehicle frame rail 12 has a C-shaped cross-sectional configuration including an upper horizontal top portion 13, a lower horizontal bottom portion 15, and a vertical side portion 17 extending therebetween. In the illustrated example, the fifth wheel hitch assembly 10 includes a hitch plate 14 typically supported above a vehicle frame rail 12 by a pair of mounting brackets 16, a pair of angle members 18 welded to an associated vehicle frame rail 12, and an intermediate mounting member 20 positioned between the mounting brackets 16 and the angle members 18.

As best illustrated in FIG. 2, the present inventive fifth wheel hitch assembly 30 includes mounting brackets 32 adapted to support a hitch plate 33. The fifth wheel hitch assembly 30 also includes support brackets 34 to releasably secure the mounting brackets 32 to the associated vehicle frame rails 12. Specifically, each support bracket 34 includes a lower portion 36 removably or releasably secured to the vertical portion 17 of the associated vehicle frame rail 12, and an upper portion 38 removably or releasably secured to an associated mounting bracket 32.

In the illustrated embodiment of FIG. 2, the vertical portion 17 of the frame rail 12 includes a plurality of longitudinally spaced apertures 35a, while the lower portion 36 of the mounting bracket 34 includes a plurality of longitudinally spaced apertures 35b, wherein each aperture 35b of the lower portion 36 is aligned with an aperture 35a of the vertical portion 17. As shown, the apertures 35a of the vertical portion 17 are more tightly spaced than the lower portion 36. As a result, the apertures 35b of the lower portion 36 can make different alignments with the apertures 35a of the vertical portion 17, thereby allowing more finite positioning of the support bracket 34 with respect to the frame rail 12, as well as allowing variously configured support brackets to be utilized. To secure the lower portion 36 of the support bracket 34 to the vertical portion 17 of the vehicle frame rail 12, mechanical fasteners (such as bolts 39) are inserted through the aligned apertures of the lower portion 36 and the vertical portion 17.

The upper portion 38 of each support bracket 34 further includes a plurality of longitudinally-spaced apertures 50 that receive mechanical fasteners such as bolts 52 therein that are received within corresponding longitudinally-spaced apertures (not shown) of the corresponding mounting bracket 32, thereby securing the mounting bracket 32 to the support bracket 34. Alternatively, the upper portion 38 may be fixedly secured to the associated mounting bracket 32, such as by welding.

Figure 3:
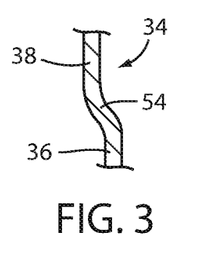
FIG. 3 is a partial, cross-sectional end view of a mounting bracket.

As best illustrated in FIG. 3, the lower portion 36 and the upper portion 38 of the support bracket 34 are horizontally offset from one another via an intermediate bend 54, thereby allowing the support brackets 34 to be utilized within various fifth wheel systems requiring different widths between the pairings of support brackets 34 by changing the inner and outer orientation of the support brackets 36 with respect to the associated frame rails 12.

It should be appreciated that the use of the present inventive mounting bracket eliminates the necessity of additional mounting components, which may result in a material size and weight reduction of the fifth wheel hitch assembly. Fifth wheel hitch assemblies requiring various spacing between the associated support brackets are accommodated in the present design by configuring the mounting bracket such that the upper portion is positioned outwardly or inwardly from the lower portion. However, it is noted that planar configurations may also be employed via shims (not shown) located between the upper portion 38 of the mounting bracket 34 and the associated mounting bracket 32 in order to accommodate for fifth wheel hitch assemblies requiring variously spaced support brackets.

Figure 4:
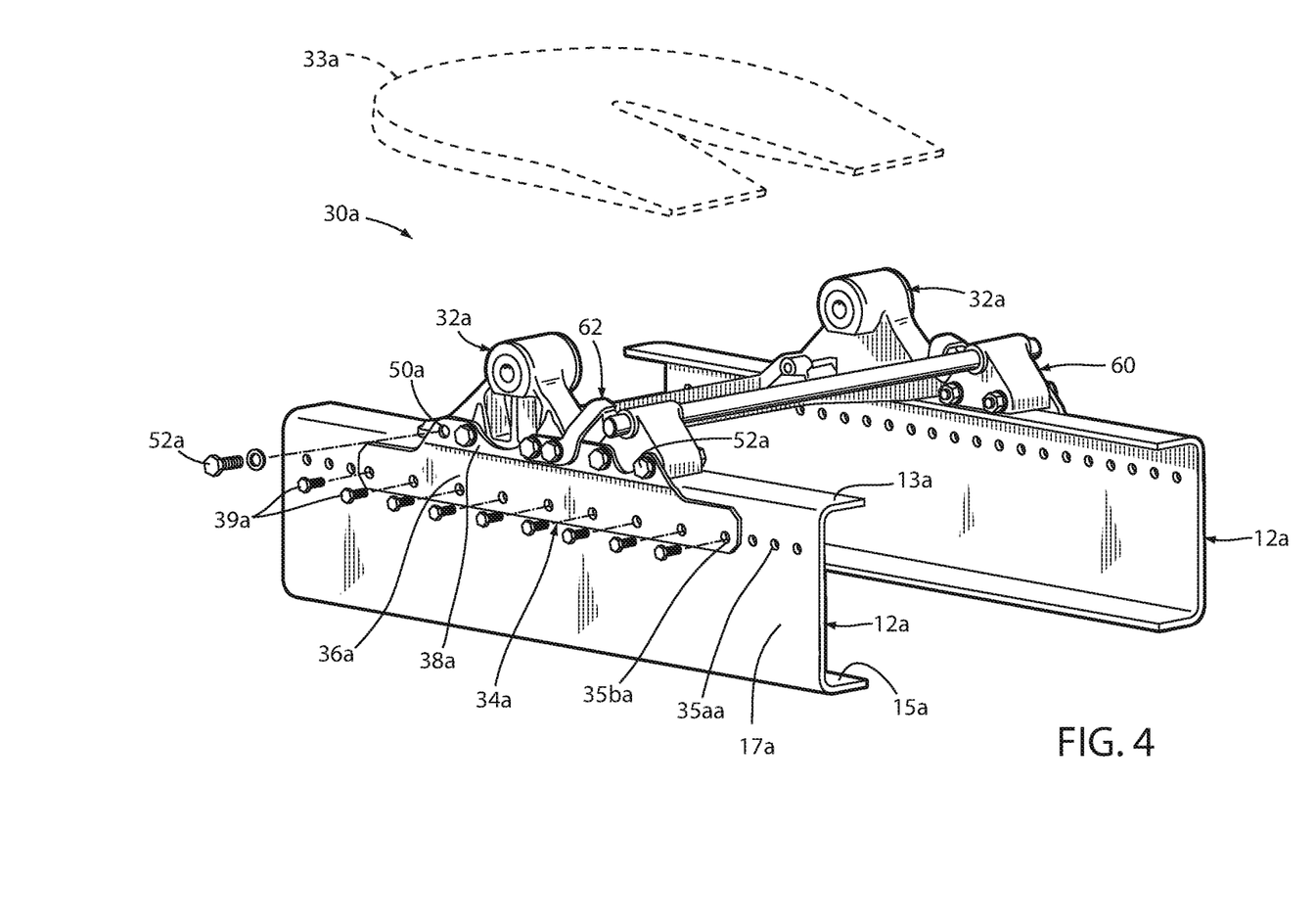
FIG. 4 is a perspective view of an alternative embodiment of the hitch assembly.

The reference numeral 30a (FIG. 4) generally designates another embodiment of the fifth wheel hitch assembly. Since the hitch assembly 30a is similar to the previously described hitch assembly 30, similar parts appearing in FIG. 2 and FIG. 4, respectively are represented by the same, corresponding reference numeral, except for the suffix "a" in the numerals of the latter. In the illustrated example, the upper portion 38a of the each support bracket 34a includes additional apertures or mounting locations 50a than required for releasable mounting the associated mounting bracket 32a to the support bracket 34a. As a result, the mounting brackets 32a may be selectively mounted at different positions along the length of the support brackets 34a. Alternatively, additional components and assembly may be releasably mounted to the additional apertures or mounting locations 50a not occupied by the mounting brackets 32a. For example, additional assemblies such as a tilt lock-out arrangement 60 adapted to engage the fifth wheel hitch plate 33a and prevent the fifth wheel hitch plate 33a from tilting with respect to the frame rails 12a in a manner known in the art, and a tilt-stop arrangement 62 adapted to abut the fifth wheel hitch plate 33a and limit the amount of tilt of the fifth wheel hitch plate 33a, may be releasably secured to the support bracket 34a at various mounting locations 50a.

The reference numeral 30b (FIG. 5) generally designates another embodiment of the present invention. Since the fifth wheel hitch assembly 30b is similar to the previously described fifth wheel hitch assembly 30, similar parts appearing in FIG. 2 and FIG. 5, respectively are represented by the same, corresponding reference numeral, except for the suffix "b" in the numeral of the latter. In the illustrated example, the support bracket 34b (FIG. 6) is corrugated along the length thereof, thereby increasing the relative structural integrity of the same. As illustrated, the support bracket 34b includes first sections 70 that abut the vertical portion 17b of the frame rail 12b and the vertical surfaces of the mounting bracket 32b, interspaced with second sections 72 that are spaced from the frame rail 12b and mounting bracket 32b.

Figure 5:
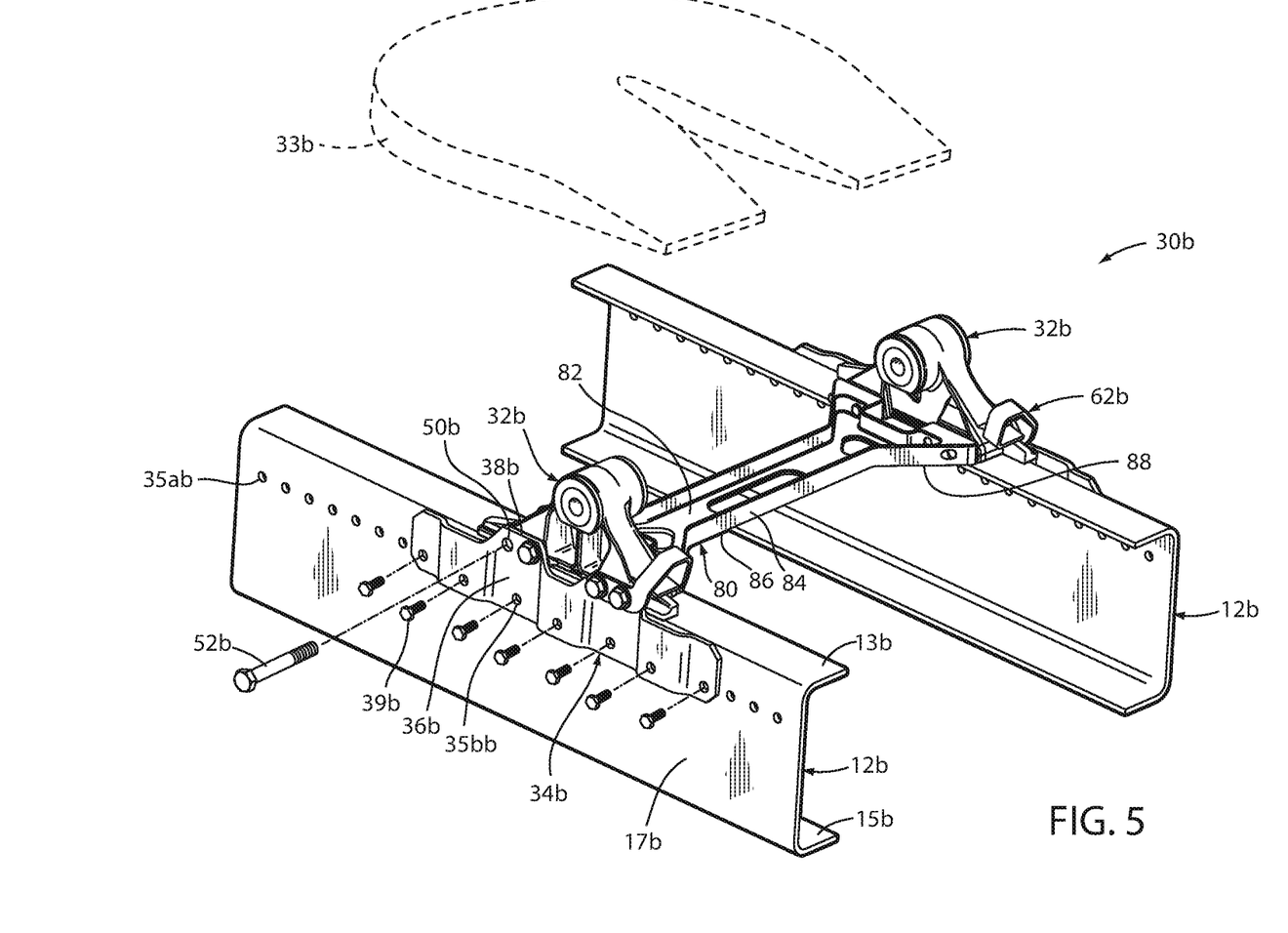
FIG. 5 is a perspective view of another alternative embodiment of the hitch assembly.

The fifth wheel hitch assembly 30b further includes a dog-bone shaped structural cross member 80 that includes a bottom wall 82 and an upwardly-extending side wall 84 surrounding a narrowed central portion 86 and flared end portions 88. The cross member 80 is releasably secured to inwardly-facing surfaces of the mounting brackets 32b by the bolts 52b that secure the mounting brackets 32b to the support brackets 34b.

Figures 6, 7:
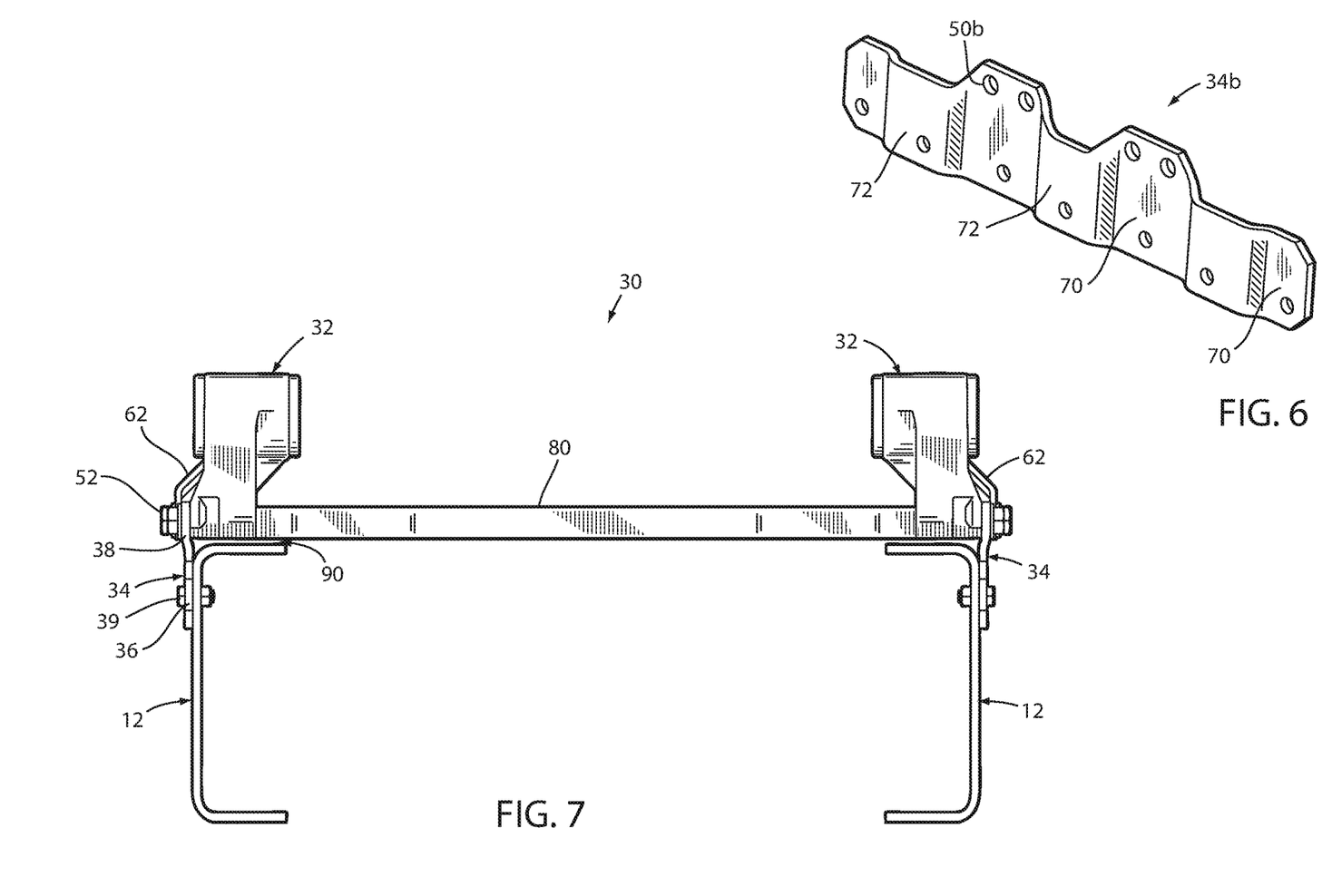
FIG. 6 is a perspective view of a support bracket of the embodiment of the hitch assembly shown in FIG. 5.
FIG. 7 is an end view of yet another alternative embodiment of the hitch assembly.

As best illustrated in FIG. 7, the various embodiments of the support brackets 34 as described herein may be configured such that the mounting brackets 32 and/or the cross member 80 is spaced from the upper horizontal portions 13 of the frame member 12, thereby defining a gap 90 therebetween.

Referring now to FIGS. 8-11, the reference numeral 1010 generally designates a fifth wheel hitch assembly that includes a support bracket 1012 adapted to operably couple with a tractor or vehicle frame 1014. The hitch assembly 1010 also includes a hitch plate 1016 that is coupled to the support bracket 1012 for pivoting between a first position and a second position. The hitch plate 1016 has a throat 1018 adapted to receive a kingpin 1020 of a trailer 1022. The hitch plate 1016 also has an intermediate portion 1024 pivotably coupled with the support bracket 1012 and has a rearwardly extending rear portion 1026 having a first section 1028 and a second section 1030 juxtapositioned across the throat 1018 from one another. The hitch assembly 1010 also includes a stabilizer assembly 1032 that is operable between an unlocked position 1034 and a locked position 1036. In the unlocked position 1034 the stabilizer assembly 1032 is coupled with a select one of the support bracket 1012 or the rear portion 1026 of the hitch plate 1016, such that the hitch plate 1016 may pivot between the first and second positions. In the locked position 1036 the stabilizer assembly 1032 is coupled with the support bracket 1012 and the rear portion 1026 of the hitch plate 1016, thereby restricting movement of the hitch plate 1016 between the first and second positions and supporting the first and second sections 1026, 1028 of the rear portion 1026 of the hitch plate 1016. In the illustrated example, a controller 1038 operates the stabilizer assembly 1032 between the unlocked and locked positions 1034, 1036 from a location 1040 remote from the stabilizer assembly 1032.

Figure 8:
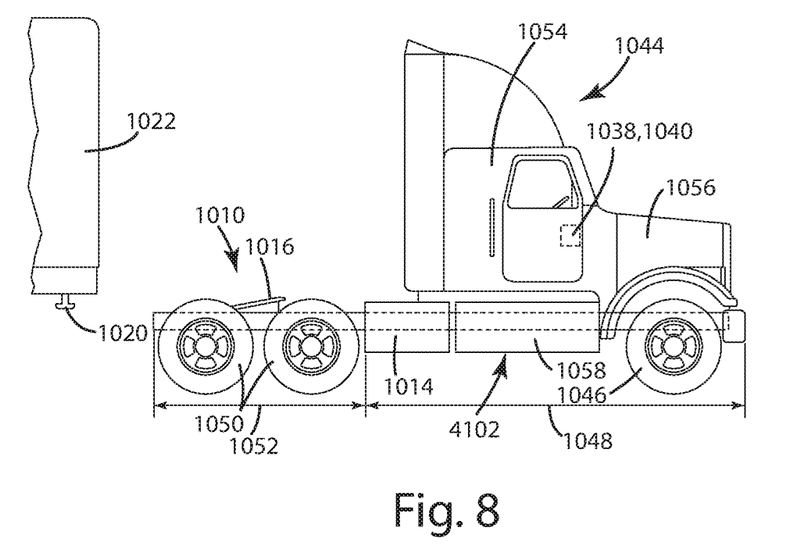
FIG. 8 is a side elevational view of a vehicle having an alternative embodiment of the fifth wheel hitch assembly of the present invention.

Referring now to FIG. 8, the vehicle frame 1014 extends along a bottom portion 1042 of a tractor or vehicle 1044. The vehicle frame 1014 is supported by two front wheels 1046 at a front end 1048 of the vehicle 1044 and by eight rear wheels 1050 at a rear end 1052 of the vehicle 1044. The front end 1048 of the vehicle 1044 has a cab 1054, an engine 1056, and fuel tanks 1058 that are supported by the vehicle frame 1014. At the rear end 1052 of the vehicle 1044, the vehicle frame or frame member 1014 supports the fifth wheel hitch assembly 1010 generally between the rear wheels 1050. It is contemplated, however, that fewer wheels may be included at the rear end 1052 of the vehicle 1044.

Figure 9:
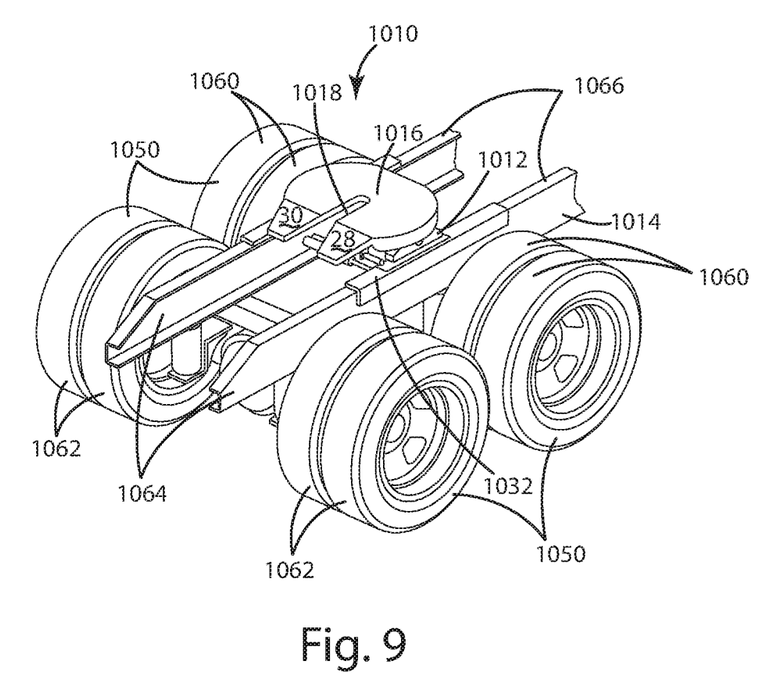
FIG. 9 is a top perspective view of a fifth wheel hitch assembly of the present invention on a vehicle frame.

As illustrated in FIG. 9, the fifth wheel hitch assembly 1010 is coupled with the vehicle frame 1014 generally between a forward set 1060 and a rearward set 1062 of the rear wheels 1050. The vehicle frame 1014 includes two parallel beams 1064 extending from the rear end 1052 (FIG. 8) to the front end 1048 of the vehicle 1044 (FIG. 8). The beams 1064 are positioned inside the rear wheels 1050, such that two wheels are laterally located outside the beams 1064 on both sides of the vehicle frame 1014 for the forward and rearward sets 1060, 1062 of the rear wheel 1050. The fifth wheel hitch assembly 1010 is coupled with a top surface 1066 of the beams 1064 of the vehicle frame 1014 and generally centered laterally between the beams 1064. More specifically, the support bracket 1012 of the fifth wheel hitch assembly 1010 is coupled with the top surface 1066 of the beams 1064 of the vehicle frame 1014. The hitch plate 1016 is pivotably coupled with the support bracket 1012, aligning the first and the second section 1028, 1030 to face rearward, substantially positioning the throat 1018 of the hitch plate 1016 in the center of and in parallel alignment with the beams 1064 of the vehicle frame 1014. It is contemplated that the fifth wheel hitch assembly 1010 may be disposed at other locations along the rear end 1052 of the vehicle frame 1014.

Figure 10:
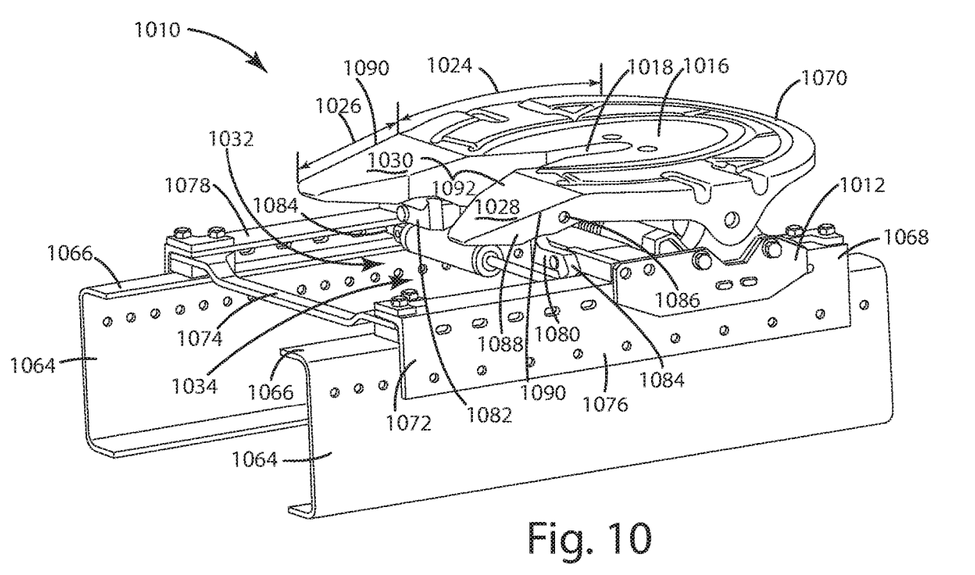
FIG. 10 is a top perspective view of a fifth wheel hitch assembly of the present invention with one embodiment of a stabilizer assembly in an unlocked position.

Referring now to FIG. 10, the support bracket 1012 is operably coupled with the top surface 1066 of the beams 1064. The support bracket 1012 extends on the beams 1064 from a front end 1068 that is substantially aligned with a forward end 1070 of the hitch plate 1016 to a rear end 1072 that extends beyond the rear portion 1026 of the hitch plate 1016. The rear end 1072 of the support bracket 1012 includes a support beam 1074 that extends laterally between a first side 1076 and a second side 1078 of the support bracket 1012, corresponding to the beams 1064. Likewise, the stabilizer assembly 1032 couples with and extends between the first and second sides 1076, 1078 of the support bracket 1012.

Figure 11:
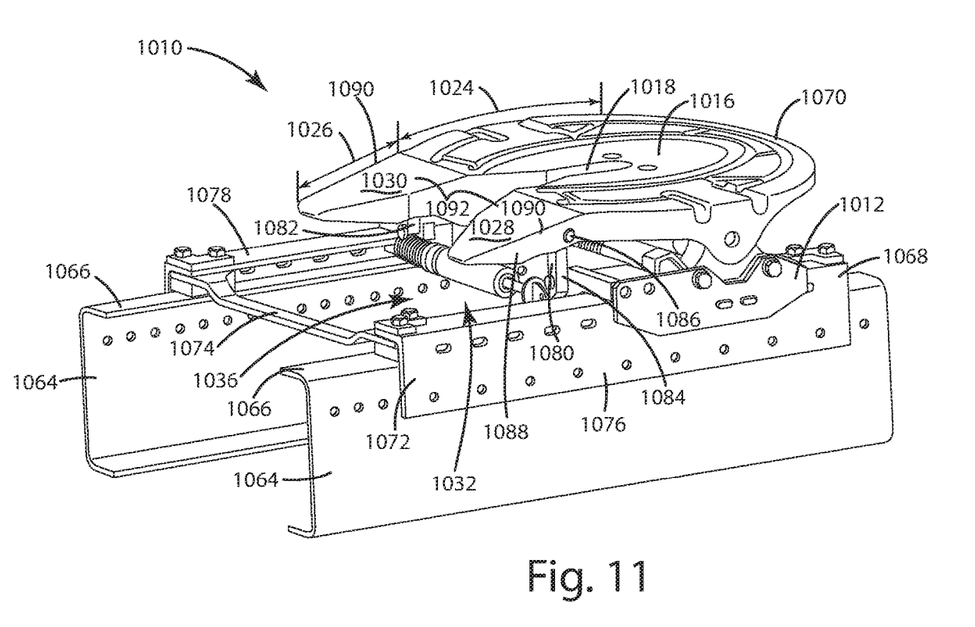
FIG. 11 is a top perspective view of a fifth wheel hitch assembly of the present invention with one embodiment of a stabilizer assembly in a locked position.

One embodiment of the stabilizer assembly 1032, as illustrated in FIGS. 10 and 11, includes a first hammer-shaped swing lock 1080 and a second hammer-shaped swing lock 1082 that are pivotably coupled with the first and second sides 1076, 1078 of the support bracket 1012, respectively, below the first and second sections 1028, 1030 of the hitch plate 1016. A handle end 1084 of the first and second swing lock 1080, 1082 is pivotably coupled with the support bracket 1012 in substantially vertical alignment with and below an aperture 1086 formed in an outer side flange 1088 of the respective first and second section 1028, 1030. The outer side flange 1088 extends down substantially orthogonally from an outside edge 1090 of an upper surface 1092 of the first and second section 1028, 1030. In FIG. 10, the apertures 1086 are not engaged by the stabilizer assembly 1032, and accordingly, the stabilizer assembly is in the unlocked position 1034, wherein the hitch plate 1016 may pivot about the support bracket 1012 between the first and second positions. However, as shown in FIG. 11, the first and second swing lock 1080, 1082 are engaged with the apertures 1086, placing the stabilizer assembly 1032 in the locked position 1036, such that the hitch plate 1016 is restricted from pivoting about the support bracket 1012 and the rear portion 1026 of the hitch plate 1016 is vertically supported at both the first and second section 1028, 1030.

Figure 12:
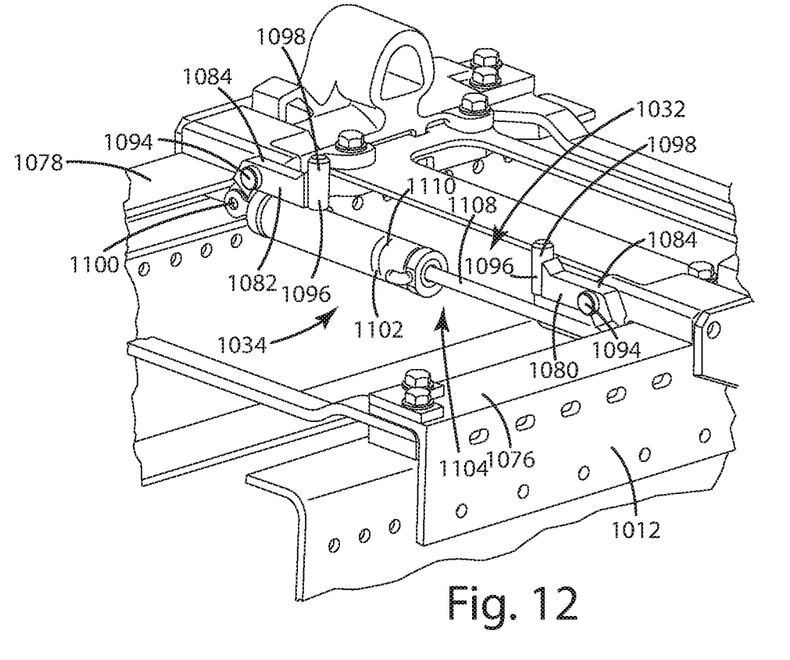
FIG. 12 is an enlarged partial top perspective view of one embodiment of a stabilizer assembly in an unlocked position.

In the unlocked position 1034, as shown in FIG. 12 without the hitch plate 1016 for illustration purposes, the first and second swing locks 1080, 1082 extend laterally inward from the first and second sides 1076, 1078 of the support bracket 1012, respectively, whereby the handle ends 1084 of the swing locks are pivotably coupled to the sides about a pivot connection 1094. The first and second swing locks 1080, 1082 extend inwardly to a head end 1096 that includes a cylindrically shaped post 1098 extending orthogonally therefrom. Further, in the unlocked position 1034, the first and second swing locks 1080, 1082 extend at an angle down and outward from the pivot connection 1094 to an actuator end 1100. A pneumatic cylinder 1102 extends between the actuator ends 1100 of the handle ends 1084 of each of the first and second swing locks 1080, 1082. The pneumatic cylinder 1102 is operable between an expanded condition 1104 (FIG. 12) and a contracted condition 1106 (FIG. 13) that operates the stabilizer assembly 1032 between the unlocked position 1034 and the locked position 1036, respectively. In the locked position 1036, the cylindrically shaped posts 1098 engage the apertures 1086, detachably coupling head ends 1096 of the first and second swing locks 1080, 1082 with the first and second sections 1028, 1030 of the hitch plate 1016.

Figure 13:
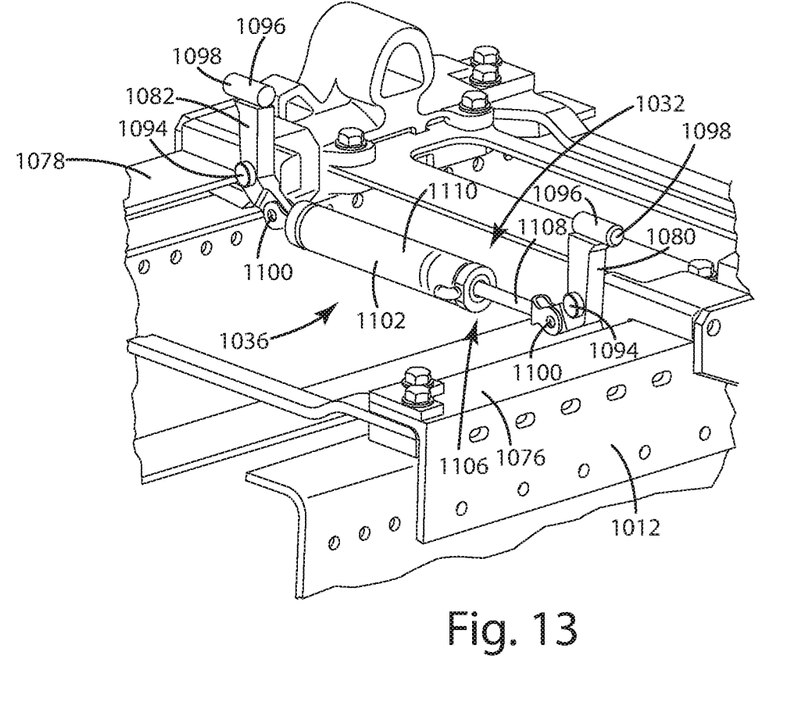
FIG. 13 is an enlarged partial top perspective view of one embodiment of a stabilizer assembly in a locked position.

As illustrated in FIGS. 12 and 13, the pneumatic cylinder 1102 includes an extension rod 1108 and a cylinder housing 1110, wherein the extension rod 1108 slidably moves within the cylinder housing 1110 upon operation of the pneumatic cylinder 1102 between the expanded and contracted positions 1104, 1106. The pneumatic cylinder 1102 is pivotally coupled between the actuator ends 1100, at an angled location below the pivot connections 1094 of the swing locks 1080, 1082 with the support bracket 1012. As such, the swing locks 1080, 1082 are permitted to swing from the generally horizontal position, when the pneumatic cylinder 1102 is in the extended condition 1104, to a substantially vertical position, when the pneumatic cylinder 1102 is in the contracted condition 1106, allowing the stabilizer assembly 1032 to engage in the locked position 1036. The pneumatic cylinder 1102 is operated by the controller 1038 that is placed at the location 1040 (FIG. 8), remote from the stabilizer assembly 1032, located in the cab 1054 (FIG. 8) of the vehicle 1044 to operate the stabilizer assembly 1032 between the unlocked position 1034 and the lock position 1036 without a user having to exit the cab 1054 of the vehicle 1044. However, it is contemplated that the controller 1038 may be placed at an alternative location, such as on or near the fifth wheel hitch assembly 1010. The pneumatic cylinder 1102 is of a type generally known and understood by those skilled in the art, such that the connection and internal operation of the pneumatic cylinder is not described herein.

Figure 14:
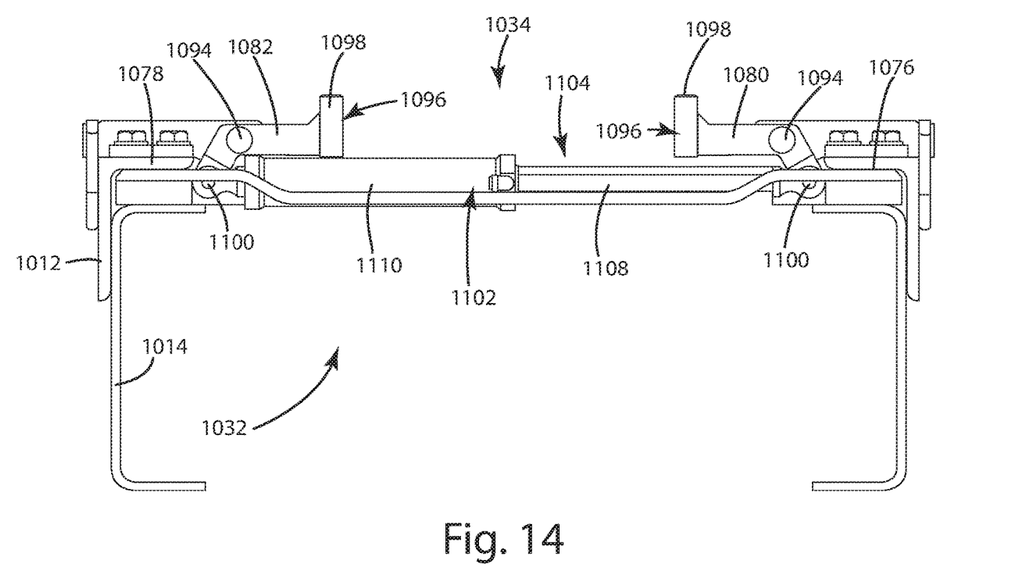
FIG. 14 is a partial rear elevational view of one embodiment of a stabilizer assembly in an unlocked position.
Figure 15:
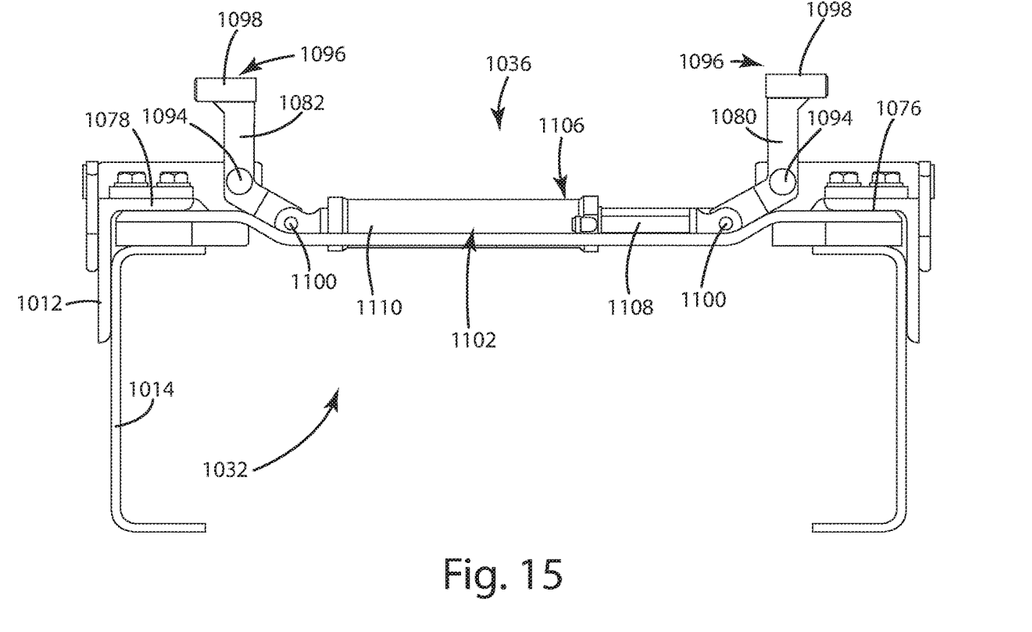
FIG. 15 is a partial rear elevational view of one embodiment of a stabilizer assembly in a locked position.

As further illustrated in FIGS. 14 and 15, in the unlocked position 1034, as shown in FIG. 14, the first and second swing locks 1080, 1082 are substantially horizontal and in linear alignment with each other and the pneumatic cylinder 1102 extending there between. In such unlocked position 1034, the cylindrical posts 1098 extend vertically and substantially orthogonal to the pneumatic cylinder 1102. Further, the extension rod 1108 of the pneumatic cylinder 1102 is extending from the cylinder housing 1110 of the pneumatic cylinder 1102 to position the actuator end 1100 of the first and second swing locks 1080, 1082 laterally outward from the pivot connection 1094 of the swing locks with the support bracket 1012.

As shown in FIG. 15 the extension rod 1108 of the pneumatic cylinder 1102 has extended into the cylinder housing 1110, as the pneumatic cylinder 1102 is in the contracted condition 1106. In the contracted condition 1106, the actuator ends 1100 of the first and second swing locks 1080, 1082, have pivoted about the pivot connections 1094 laterally inward from the first and second sides 1076, 1078 of the support bracket 1012. In the contracted condition 1106 of the pneumatic cylinder 1102, the swing locks 1080, 1082 are substantially vertical, such that the cylindrical posts 1098 on the head ends 1096 are substantially horizontal and in coaxial alignment with the apertures 1086 formed in the first and second section 1028, 1030 of the hitch plate 1016 (FIG. 11). Accordingly, the first and second swing locks 1080, 1082 pivot ninety degrees between the expanded and contracted conditions 1104, 1106 of the pneumatic cylinder 1102. The engagement of the cylindrical posts 1098 on the first and second swing locks 61080, 1082 with the apertures 1086 place the stabilizer assembly 1032 in the locked position 1036. It is also contemplated that the first and second swing locks 1080, 1082 are pivotably coupled in an alternative arrangement with the support bracket 1012 or the vehicle frame 1014 such that the first and second swing locks 1080, 1082 couple with the first and second section 1028, 1030, respectively, of the hitch plate 1016 (FIG. 11).

Figure 16:
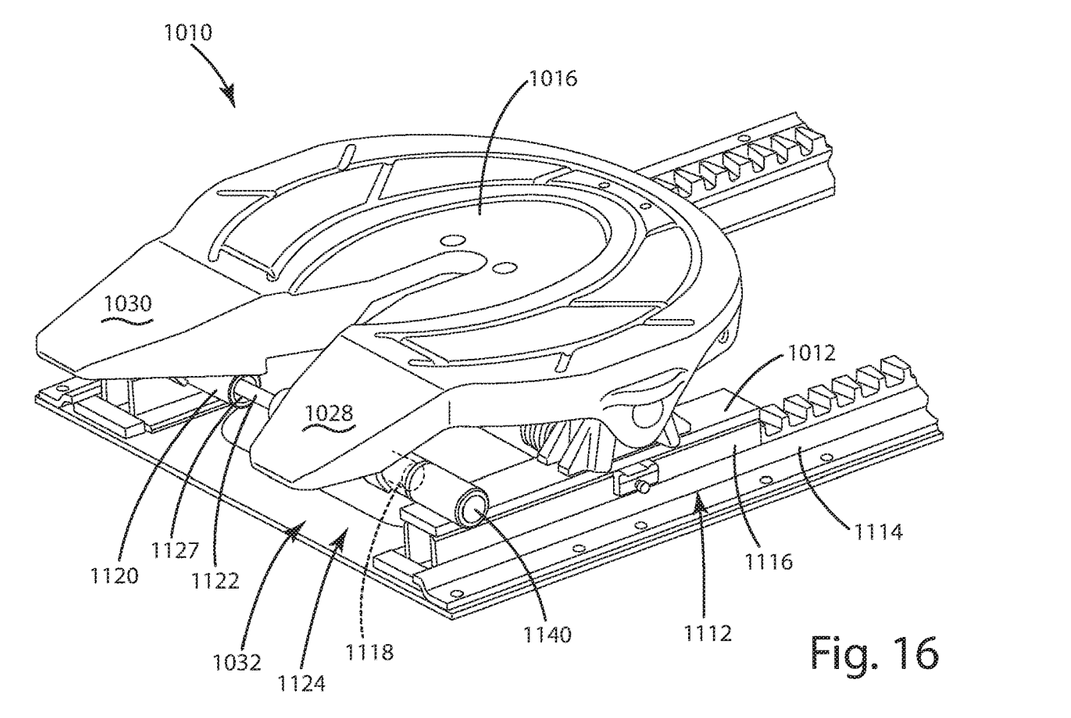
FIG. 16 is a top perspective view of a fifth wheel hitch assembly of the present invention with another embodiment of a stabilizer assembly in an unlocked position.
Figure 17:
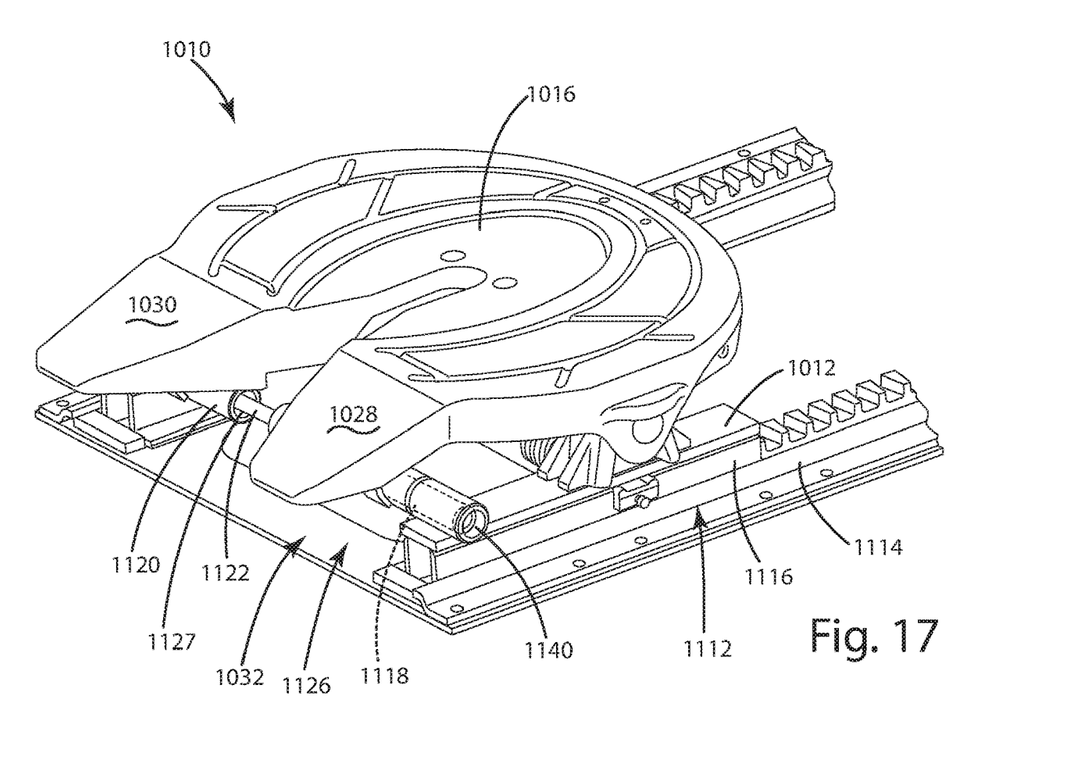
FIG. 17 is a top perspective view of a fifth wheel hitch assembly of the present invention with another embodiment of a stabilizer assembly in a locked position.

Referring now to FIGS. 16 and 17, a track assembly 1112 is adapted to be coupled between the support bracket 1012 of the fifth wheel hitch assembly 1010 and the vehicle frame 1014 (not shown), allowing the hitch plate 1016 to be slidably positioned at various horizontal fore-aft positions relative to the rear end 1052 the vehicle frame 1014 (FIG. 8). The track assembly 1112 includes a rail 1114 that is coupled with the vehicle frame 1014 and slidably engaged with a carriage 1116 supporting the support bracket 1012. It is contemplated that the support bracket 1012 may be operably coupled with the beams 1064 of the vehicle frame 1014 (FIG. 9), without the track assembly, as illustrated in FIGS. 10-15. However, it is also contemplated that the stabilizer assembly 1032 embodiment illustrated in FIGS. 10-15, may be adapted to include a track assembly.

As further illustrated in FIGS. 16 and 17, an alternative embodiment of the stabilizer assembly 1032 is shown, including a first pin 1118 and second pin 1120 slidably coupled below the first and second section 1028, 1030 of the hitch plate 1016, respectively. A threaded rod 1122 is threadably engaged with and extends between the first and second pins 1118, 1120, such that axle rotation of the threaded rod 1122 translates the pins 1118, 1120 between the unlocked position 1124 (FIG. 16) and the locked position 1126 (FIG. 17). The threaded rod 1122 is coaxially disposed within a cylindrical cavity 1127 in the first and second pins and threadably engaged therein.

Figure 18:
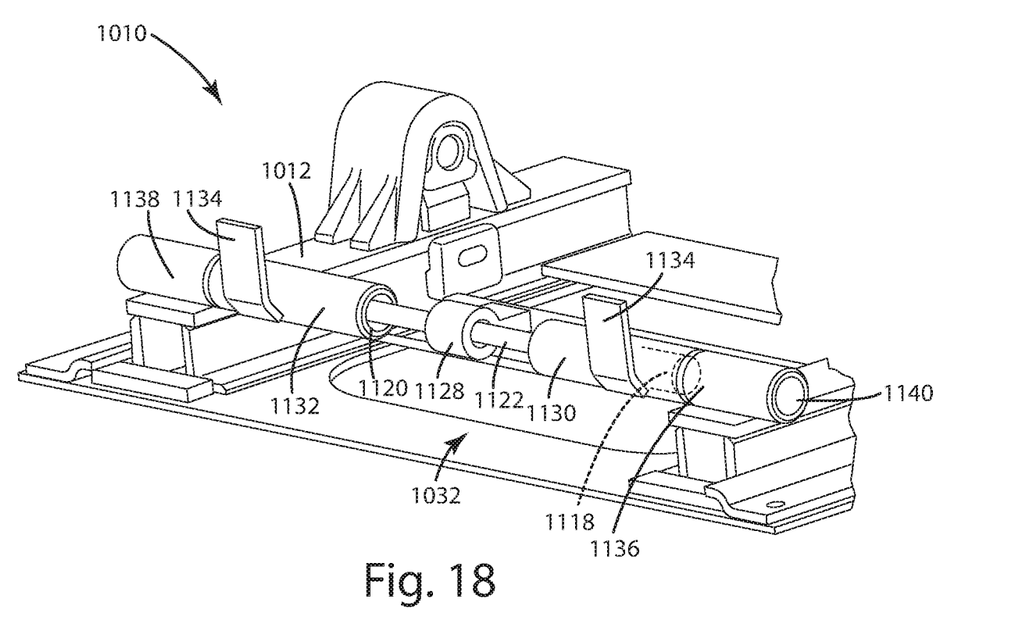
FIG. 18 is an enlarged partial top perspective view of a fifth wheel hitch assembly with another embodiment of a stabilizer assembly in an unlocked position.
Figure 19:
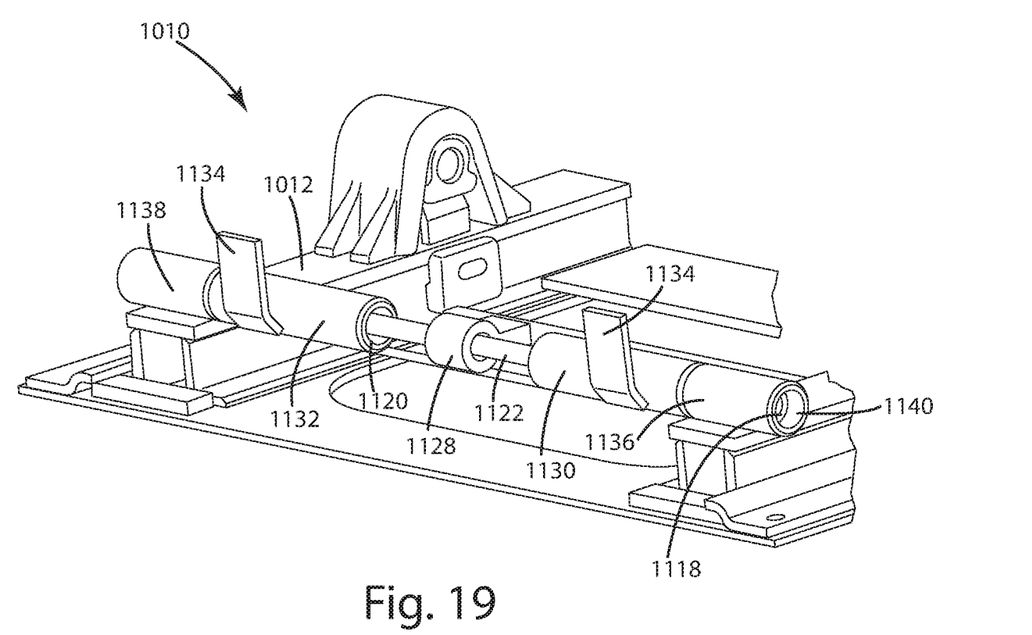
FIG. 19 is an enlarged partial top perspective view of a fifth wheel hitch assembly with another embodiment of a stabilizer assembly in a locked position.

As shown in FIGS. 18 and 19, the fifth wheel hitch assembly 1010 is shown without the hitch plate 1016 for illustration purposes. A rotation motor 1128 is centrally positioned between the first and second pins 1118, 1120 and thereby substantially aligned below the throat of the hitch plate (FIG. 17). The rotation motor 1128 is geared to engage the threaded rod 1122 about a geared portion (not shown) thereof, such that axial rotation of the threaded rod 1122 by the rotation motor 1128 causes, otherwise stationary, axial rotation of the threaded rod 1122. Such rotation, in turn, causes lateral translation of the first and second pins 1118, 1120 within a respective first tubular housing 1130 and second tubular housing 1132. The first and second tubular housings 1130, 1132 have a connection bracket 1134 extending vertically therefrom allowing the connection bracket 1134 to attach with a bottom portion of the respective first and second section 1028, 1030 of the hitch plate 1016 (FIG. 17). Upon pivotable alignment of the hitch plate 1016, about the support bracket 1012, the first and second tubular housings 1130, 1132 laterally and coaxially align with a respective first engagement port 1136 and second engagement port 1138 disposed on the support bracket 1012. The first and second engagement ports 1136, 1138 have a cylindrical hole 1140 formed therein that coaxially aligns and is adapted to receive the respective first and second pins 1118, 1120. As shown in FIG. 19, the first pin 1118 is engaged with the hole 1140 in the first engagement port 1136, first with a portion of the first pin 1118 remaining within the first tubular housing 1130 transitioning the stabilizer assembly 1032 to the locked position 1126, wherein shear stress is applied to the first pin 1118 when the hitch plate 1016 is restricted from pivoting about the support bracket 1012. In the locked position 1126, the hitch plate 1016 (not shown) is restricted from pivoting about the support bracket 1012 by both the first and second pins 1118, 1120, stabilizing the rear portion 1026 of the hitch plate 1016 at the first and second section 1028, 1030.

Figure 20:
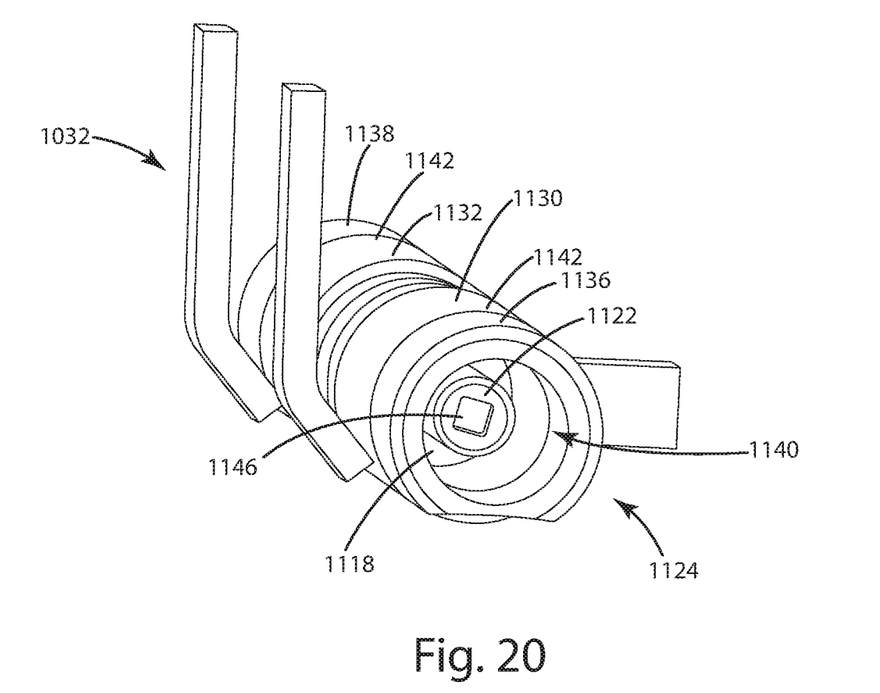
FIG. 20 is an enlarged side elevational view of the stabilizer assembly of FIG. 18.
Figure 21:
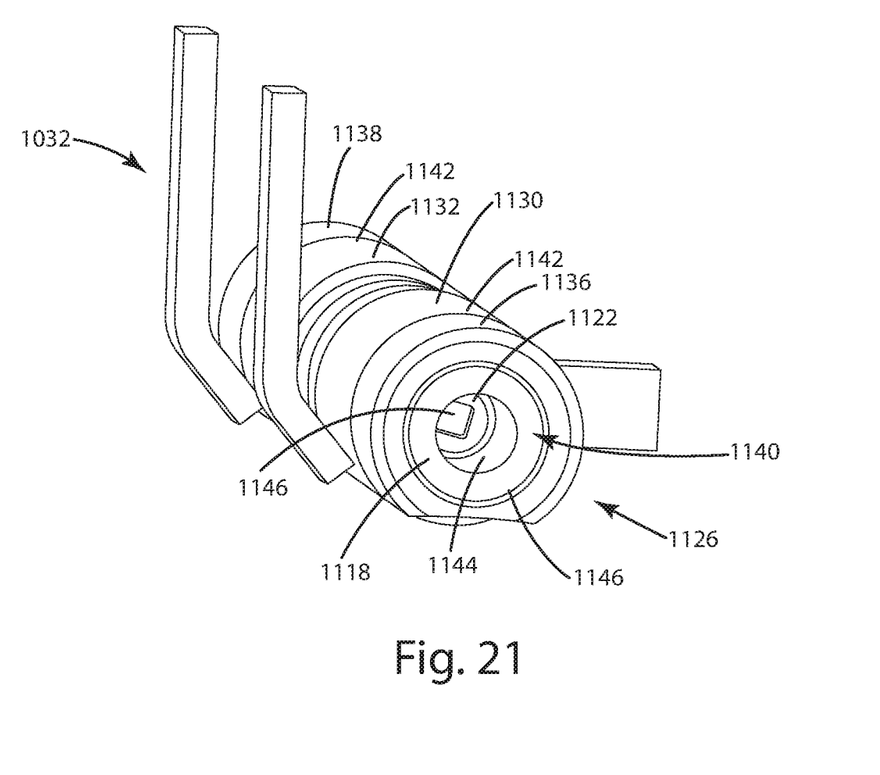
FIG. 21 is an enlarged side elevational view of the stabilizer assembly of FIG. 19.

As shown in FIGS. 20 and 21, the threaded rod 1122 extends within the tubular housing 1130, 1132 to an outside edge 1142 thereof, and accordingly, the threaded rod 1122 and the first and second pins 1118, 1120 (not shown) threadably engaged therewith pivot with the hitch plate 1016 (not shown) when the stabilizer assembly 1032 is in the unlocked position 1124. The first and second pins 1118, 1120 are substantially tubular shaped and include a threaded inside surface 1144 to engage the threaded rod 1122 and a substantially smooth exterior surface 1146 to slidably engage the respective engagement port 1136, 1138 in the locked position 1126. The threaded rod 1122 includes a square shaped indentation 1146 on the end surface thereof. The indentation 1146 is formed to receive a tool that may be inserted through the cylindrical hole 1140 in the engagement port 1136, 1138 and engage the threaded rod 1122 to axially rotate the threaded rod 1122 and thereby adjust the lateral position of the first and second pin 1118, 1120 with respect to the first and second engagement ports 1136, 1138. It is contemplated that the rotation motor 1128 may not be included or may incur periods of non-functionality, wherein the utilization of the indentation and a tool to axially rotate the threaded rod 1122 may be necessary. It is further contemplated that the first and second pin 1118, 1120 may have an alternative locked position 1126 from that illustrated in FIGS. 17, 19, and 21.

As generally illustrated in FIGS. 8-21 the method for stabilizing the hitch plate 1016 of the fifth wheel hitch assembly 1010 includes providing the vehicle frame member 1014; the support bracket 1012 operably coupled with the frame member 1014; and the hitch plate 1016 pivotably coupled to the support bracket 1012 for pivotable movement between the first position and the second position, and having the rearwardly extending first section 1028 and the rearwardly extending second section 1030. The stabilizer assembly 1032 is operable between an unlocked position 1034, wherein the hitch plate 1016 may pivot between the first and second positions, and a locked position 1036, wherein the first and second sections 1028, 1030 are detachably coupled with the support bracket 1012, thereby restricting movement of the hitch plate 1016 between the first and second positions. The hitch plate 1016 is pivoted about the support bracket 1012 to position the first and second sections 1028, 1030 in alignment with the support bracket 1012 to allow for the stabilizer assembly 1032 to transition from the unlocked position 1034 to the locked position 1036. The first and second sections 1028, 1030 of the hitch plate 1016 are coupled with the support bracket 1012 to restrict the pivotable movement of the hitch plate 1016 between the first and second positions and stabilize the first and section sections 1028, 1030 of the hitch plate 1016, thereby engaging the stabilizer assembly 1032 in the locked position 1036.

The present inventive fifth wheel hitch assembly provides a highly modular arrangement adaptable for use with vehicle frame assemblies of varying configurations. The hitch assembly further reduces initial installation as well as repair time and costs, increases overall structural rigidity, is adaptable for use in many global markets with various restriction and legal requirements, is economical to manufacture, and is particularly well adapted for the proposed use.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fifth wheel hitch assembly, comprising:
a mounting bracket adapted to support a fifth wheel hitch plate and having an outermost laterally outwardly facing substantially vertical surface;
a vehicle frame rail having a substantially horizontal portion and a substantially vertical portion; and
a support bracket having a first portion secured to the substantially vertical portion of the vehicle frame rail and a second portion secured to the laterally outwardly facing substantially vertical surface of the mounting bracket, and having a plurality of mounting positions spaced longitudinally along a substantially vertical surface of the support bracket from one another, wherein the mounting bracket is releasably secured to less than a total number of the mounting positions, and wherein the first portion and the second portion of the support bracket are permanently fixed to one another, wherein at least a portion of the support bracket is located outboard of the substantially vertical surface of the mounting bracket.

2. The fifth wheel hitch assembly of claim 1, further comprising:
at least one of a tilt lock-out arrangement and a tilt stop arrangement releasably secured to one of the mounting positions that is spaced from the mounting position to which the mounting bracket is releasably secured.

3. The fifth wheel hitch assembly of claim 1, further comprising:
a tilt stop arrangement releasably secured to the mounting position to which the mounting bracket is releasably secured.

4. The fifth wheel hitch assembly of claim 1, wherein the plurality of mounting positions includes a plurality of apertures.

5. The fifth wheel hitch assembly of claim 1, wherein the mounting bracket is releasably secured to the support bracket by a plurality of mechanical fasteners.

6. The fifth wheel hitch assembly of claim 1, wherein the first portion of the support bracket is releasably secured to the vehicle frame rail.

7. The fifth wheel hitch assembly of claim 1, wherein the second portion of the support bracket is releasably secured to a substantially vertical surface of the mounting bracket.

8. The fifth wheel hitch assembly of claim 1, further including:
a second mounting bracket;
a structural cross member extending between the mounting brackets, wherein the structural cross member is releasably secured to the mounting brackets.

9. The fifth wheel hitch assembly of claim 1, wherein the entire second portion of the support bracket is located outboard of the substantially vertical surface of the mounting bracket.

10. A fifth wheel hitch assembly, comprising:
a fifth wheel hitch plate;
a mounting bracket adapted to support the fifth wheel hitch plate and having a substantially vertical surface;
a vehicle frame rail having a substantially horizontal portion and a substantially vertical portion;
a support bracket having a first portion secured to the substantially vertical portion of the vehicle frame rail and a second portion secured to the substantially vertical surface of the mounting bracket, and having a plurality of mounting positions spaced longitudinally along the support bracket from one another, wherein the mounting bracket is releasably secured to less than a total number of the mounting positions, and wherein the first portion and the second portion of the support bracket are permanently fixed to one another;
a stabilizer assembly coupled below the hitch plate along the rear portion, wherein the stabilizer assembly operates between an unlocked position, wherein the hitch plate may pivot between a first position and a second position, and a locked position, wherein the stabilizer assembly is coupled with the rear portion and a select one of the vehicle frame or the support bracket, thereby restricting pivotable movement of the hitch plate with between the first and second positions; and a controller that operates the stabilizer assembly between the unlocked and locked positions from a location located remotely from the stabilizer assembly.

11. A fifth wheel hitch assembly, comprising:

a first mounting bracket adapted to support a fifth wheel hitch plate;

a second mounting bracket adapted to support a fifth wheel hitch plate;

a first vehicle frame rail;

a second vehicle frame rail;

a first support bracket having a first portion releasably secured to a substantially vertical portion of the first vehicle frame rail and a second portion releasably secured to a substantially vertical portion of the first mounting bracket, wherein the first portion and the second portion of the first support bracket are an integral, single-piece;

a second support bracket having a first portion releasably secured to a substantially vertical portion of the second vehicle frame rail and a second portion releasably secured to a substantially vertical portion of the second mounting bracket, the first portion and the second portion of the second support bracket are an integral, single-piece; and a structural cross member releasably secured to the first and second mounting brackets; and wherein the first mounting bracket is releasably secured to the first support bracket by a first mechanical fastener, and the second mounting bracket is releasably secured to the second support bracket by a second mechanical fastener; and wherein the first mechanical fastener releasably secures the structural cross member to the first mounting bracket, and the second mechanical fastener releasably secures the cross member to the second mounting bracket.

12. The fifth wheel hitch assembly of claim 11, wherein the first and second mechanical fasteners comprise bolts.

13. The fifth wheel hitch assembly of claim 11, further comprising:

at least one of a tilt lock-out arrangement and a tilt-stop arrangement secured to the first and second mounting brackets.

14. The first wheel hitch assembly of claim 13, wherein the at least one of the tilt lock-out arrangement and the tilt-stop arrangement are releasable secured to the first and second mounting brackets.

\* \* \* \* \*

UNITED STATES PATENT AND TRADEMARK OFFICE
CERTIFICATE OF CORRECTION

PATENT NO. : 10,661,621 B2
APPLICATION NO. : 14/996908
DATED : May 26, 2020
INVENTOR(S) : Zerba et al.

It is certified that error appears in the above-identified patent and that said Letters Patent is hereby corrected as shown below:

In the Specification

Column 1, Line 40:
Delete "to"

Column 2, Line 12:
Delete "and"

Column 2, Line 14:
"." should be — ; —

Column 3, Line 38:
"mounting" should be — support —

Column 4, Line 1:
"36" should be — 34 —

Column 4, Lines 13-14:
"mounting" should be — support —

Column 4, Line 25:
Delete "the"

Column 4, Line 48:
"numeral" should be — numerals —

Column 5, Line 28:
"1026, 1028" should be — 1028, 1030 —

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,661,621 B2

Column 5, Line 56:
"wheel" should be — wheels —

Column 6, Lines 27, 30:
"section" should be — sections —

Column 6, Line 36:
"lock" should be — locks —

Column 6, Line 41:
"section" should be — sections —

Column 7, Line 18:
"lock" should be — locked —

Column 7, Lines 52, 63:
"section" should be — sections —

Column 7, Line 57:
"61080" should be — 1080 —

Column 8, Line 16:
"section" should be — sections —

Column 8, Line 41:
"section" should be — sections —

Column 8, Line 60:
"section" should be — sections —

Column 9, Lines 12, 18:
"pin" should be — pins —

Column 9, Line 52:
"restriction" should be — restrictions —

In the Claims

Column 10, Claim 8, Line 40:
After "bracket;" insert -- and --

Column 11, Claim 10, Line 4:
Delete "with"

Column 11, Claim 11, Line 23:
"single-piece" should be — single piece —

CERTIFICATE OF CORRECTION (continued)
U.S. Pat. No. 10,661,621 B2

Column 12, Claim 11, Line 3:
"single-piece" should be — single piece —

Column 12, Claim 11, Line 5 (2nd occurrence):
Delete "and"

Column 12, Claim 13, Line 20:
"tilt-stop" should be — tilt stop —

Column 12, Claim 14, Line 23:
"first" should be — fifth —

Column 12, Claim 14, Line 25:
"tilt-stop" should be — tilt stop —

Column 12, Claim 14, Line 25:
"releasable" should be — releasably —